United States Patent [19]
Frederick

[11] Patent Number: 4,928,519
[45] Date of Patent: May 29, 1990

[54] BRAKE TESTING APPARATUS

[75] Inventor: Earl Frederick, Albuquerque, N. Mex.

[73] Assignee: Vehicle Safety Controls, Inc., Columbia City, Ind.

[21] Appl. No.: 250,081

[22] Filed: Sep. 28, 1988

[51] Int. Cl.$^5$ .............................................. G01L 5/28
[52] U.S. Cl. ........................................ 73/126; 73/117
[58] Field of Search ............ 73/126, 123, 117, 862.19, 73/862.27, 862.37, 116, 862.14, 168

[56] References Cited

U.S. PATENT DOCUMENTS

| | | | |
|---|---|---|---|
| 2,130,900 | 9/1938 | Presbrey | 265/24 |
| 3,286,517 | 11/1966 | Ostrander | 73/116 |
| 3,365,940 | 1/1968 | MacMillan | 73/117 |
| 3,633,412 | 1/1972 | Pelta | 73/126 |
| 3,712,126 | 1/1973 | Campbell | 73/117 |
| 3,899,916 | 8/1975 | Cline | 73/126 |
| 4,158,961 | 6/1979 | Ben-David | 73/117 |
| 4,577,497 | 3/1986 | Ray et al. | 73/126 |
| 4,750,354 | 6/1988 | Knestel | 73/126 |

OTHER PUBLICATIONS

*VLT Brake Test and Diagnosis Benches,* van leeuwen techniek b.v.

Primary Examiner—Jerry W. Myracle
Attorney, Agent, or Firm—Baker & Daniels

[57] ABSTRACT

The invention is a system for measuring the braking force of a vehicle, whereby a wheel of a vehicle is supported by a pair of spaced rollers having axes that are generally parallel with the axis of the wheel. At least one of the rollers is driven at a constant speed by a circulatory hydraulic fluid system which includes a hydraulic motor. The energy expended by the hydraulic motor in maintaining a constant speed of the roller(s) is a function of the pressure of the hydraulic fluid on the inlet side of the hydraulic motor. This hydraulic fluid pressure is measured and recorded both before and after application of the vehicle's brakes.

35 Claims, 5 Drawing Sheets

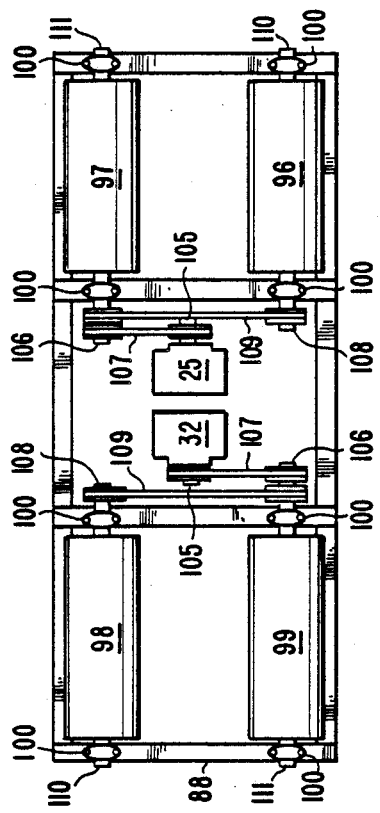
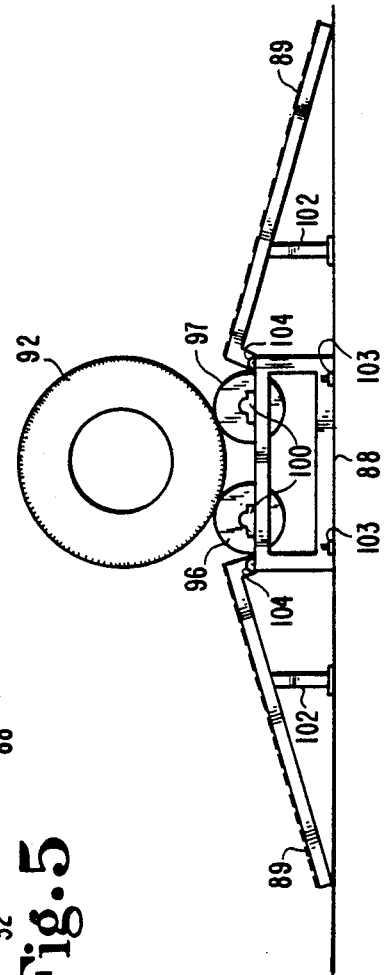
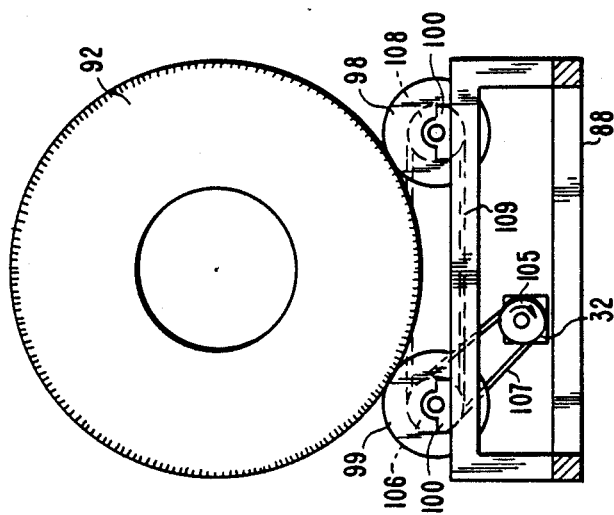

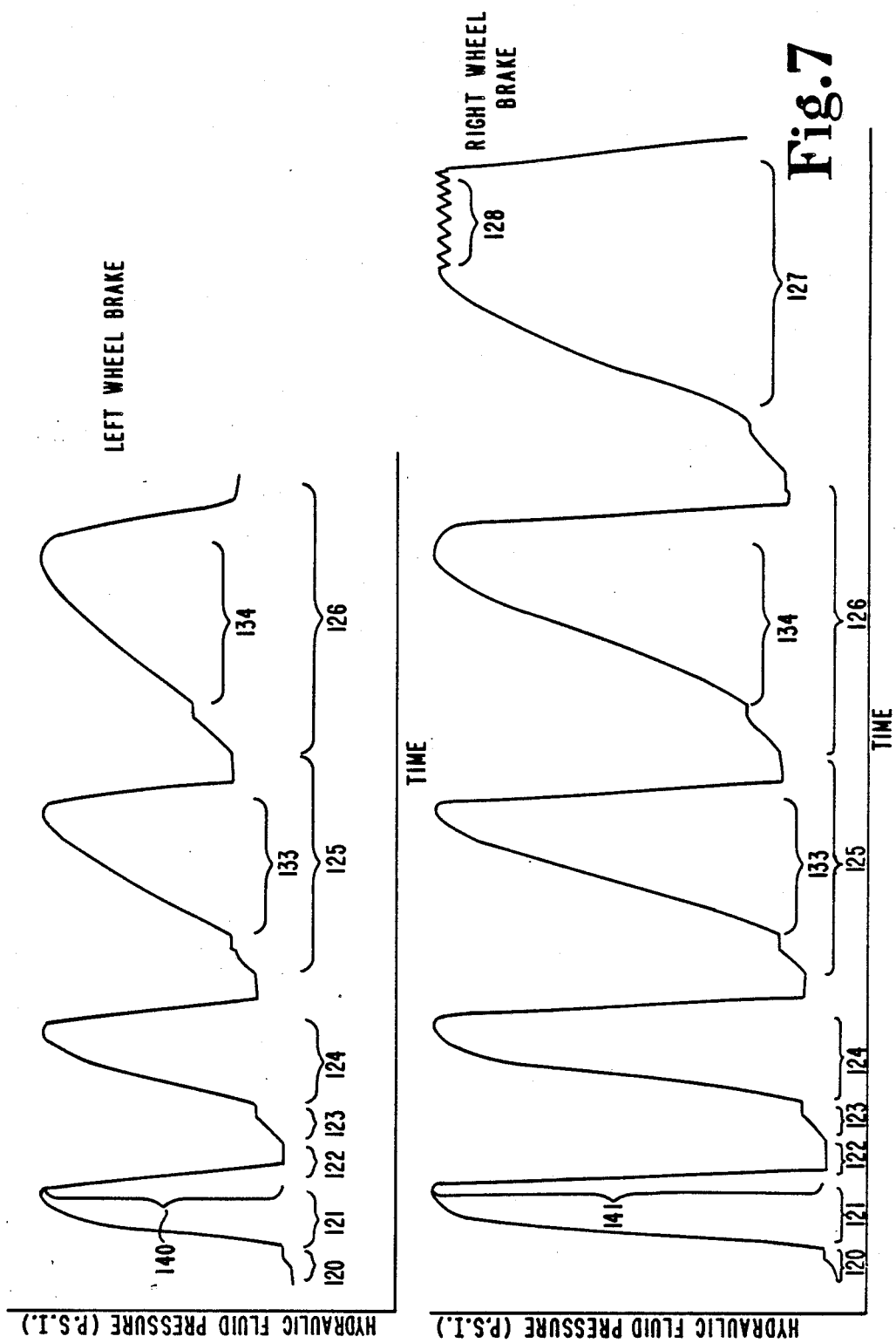

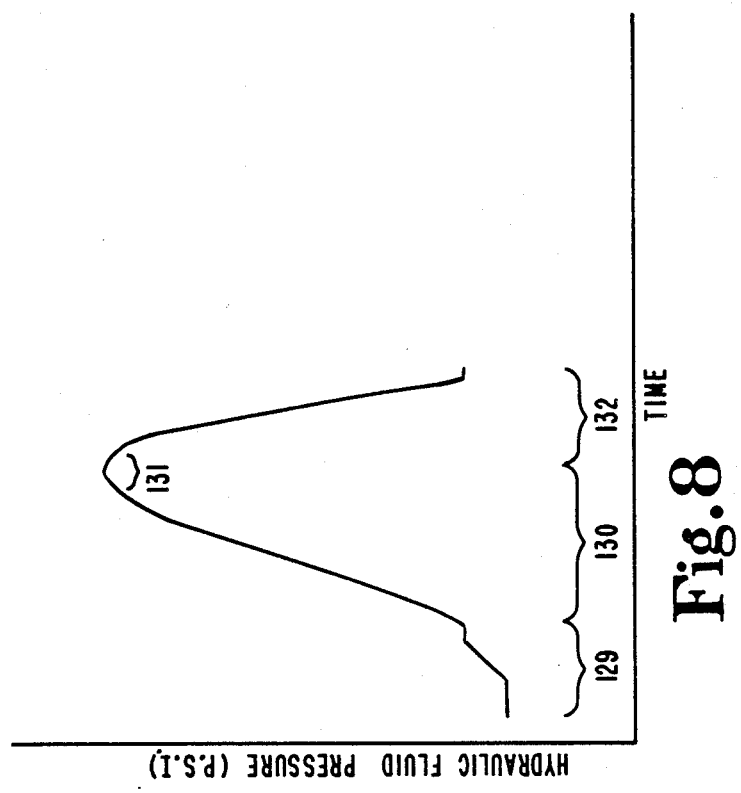

BRAKE TESTING APPARATUS

FIELD OF THE INVENTION

This invention relates to an apparatus for testing the brake system of a vehicle. In particular, the invention relates to an apparatus for very accurately indicating braking power by measuring the energy differential required to rotate a wheel before and after the application of the brakes.

BACKGROUND OF THE INVENTION

Measuring the braking system of a vehicle is an important element in ensuring the vehicle is safe to operate. Although individual components of a braking system may be inspected when the system is disassembled, such an inspection does not indicate whether the braking system as a whole is working properly. Therefore, it is desirable to provide a system in which the braking force of the entire braking system of a vehicle may be measured in an environment simulating actual road conditions. It is also desirable to provide a system which can accurately test the anti-skid and spring brake systems of vehicles.

Several on-vehicle brake testing systems have been developed in the past. A typical system is disclosed in U.S. Pat. No. 3,286,517. In that system, the wheel of a vehicle is placed on two spaced rollers. An electric motor drives one of the rollers, causing the wheel to rotate. The electric motor is synchronous, causing it to run at the same speed, but drawing current at different rates depending on the load on the motor. A wattmeter measures the wattage provided to the motor. The brakes of the vehicle are then applied, necessitating additional power to the electric motor to maintain the RPM of the rollers. This power is measured by the wattmeter before and after application of the brakes, and the wattage differential provides a measurement of braking force. Other representative patents disclosing measuring systems employing rollers include U.S. Pat. Nos. 3,365,940, 3,633,412, 2,130,900, 4,158,961, 3,712,126 and 4,577,497.

A major shortcoming of prior devices is that energy differentials resulting from the application of brakes are measured by an electric meter. This has three shortcomings. First, electric meters are not sensitive enough to measure the slight energy changes in such systems. Due to this lack of sensitivity, only very bad braking systems can be distinguished from good braking systems. However, it is desirable to more precisely identify the condition of a braking system. Second, the needles of electric meters often flicker during operation, making an accurate reading impossible. Such flickering is most problematic when testing the anti-skid features of a braking system, because such systems intermittently apply braking force. Third, prior systems do not provide a means for recording the meter readings throughout the testing process, making if difficult, if not impossible, to obtain differential measurements.

OBJECTS OF THE INVENTION

One object of the invention is to provide a brake testing system capable of measuring braking force in on-road conditions.

Another object of the invention is to provide a brake testing system capable of recording the measurements made during a test.

Another object of the invention is to provide a brake testing system capable of testing brakes at discrete, predetermined road speeds.

Another object of the invention is to provide a brake testing system utilizing a hydraulic power source and a hydraulic pressure indicator.

Another object of the invention is to provide a brake testing system that can accurately test anti-skid and spring brake systems.

Still other objects and advantages of the invention will become apparent to those of skill in the art after reading the following description of a preferred embodiment.

SUMMARY OF THE INVENTION

The invention is a system for measuring the braking force of a vehicle, whereby a wheel of a vehicle is supported by a pair of spaced rollers having axes that are generally parallel with the axis of the wheel. At least one of the rollers is driven at a constant speed by a circulatory hydraulic fluid system which includes a hydraulic motor. The energy expended by the hydraulic motor in maintaining a constant speed of the roller(s) is a function of the pressure of the hydraulic fluid on the inlet side of the hydraulic motor. This hydraulic fluid pressure is measured and recorded both before and after application of the vehicle's brakes.

BRIEF DESCRIPTION OF THE DRAWINGS

FIG. 4 is a side view of a vehicle wheel assembly in contact with the spaced rollers.

FIG. 5 is a sectional view of a vehicle wheel assembly in contact with the spaced rollers.

FIG. 6 is a top view of the two pairs of spaced rollers and their respective drive systems.

FIG. 7 is a front view of a typical strip chart pen graph for a vehicle having bad brakes on the left wheel of the vehicle and good brakes on the right wheel of the vehicle.

FIG. 8 is a front view of a typical strip chart pen graph for one wheel of a vehicle having bad anti-skid brakes.

DETAILED DESCRIPTION OF THE PRESENT INVENTION

Figure 1:
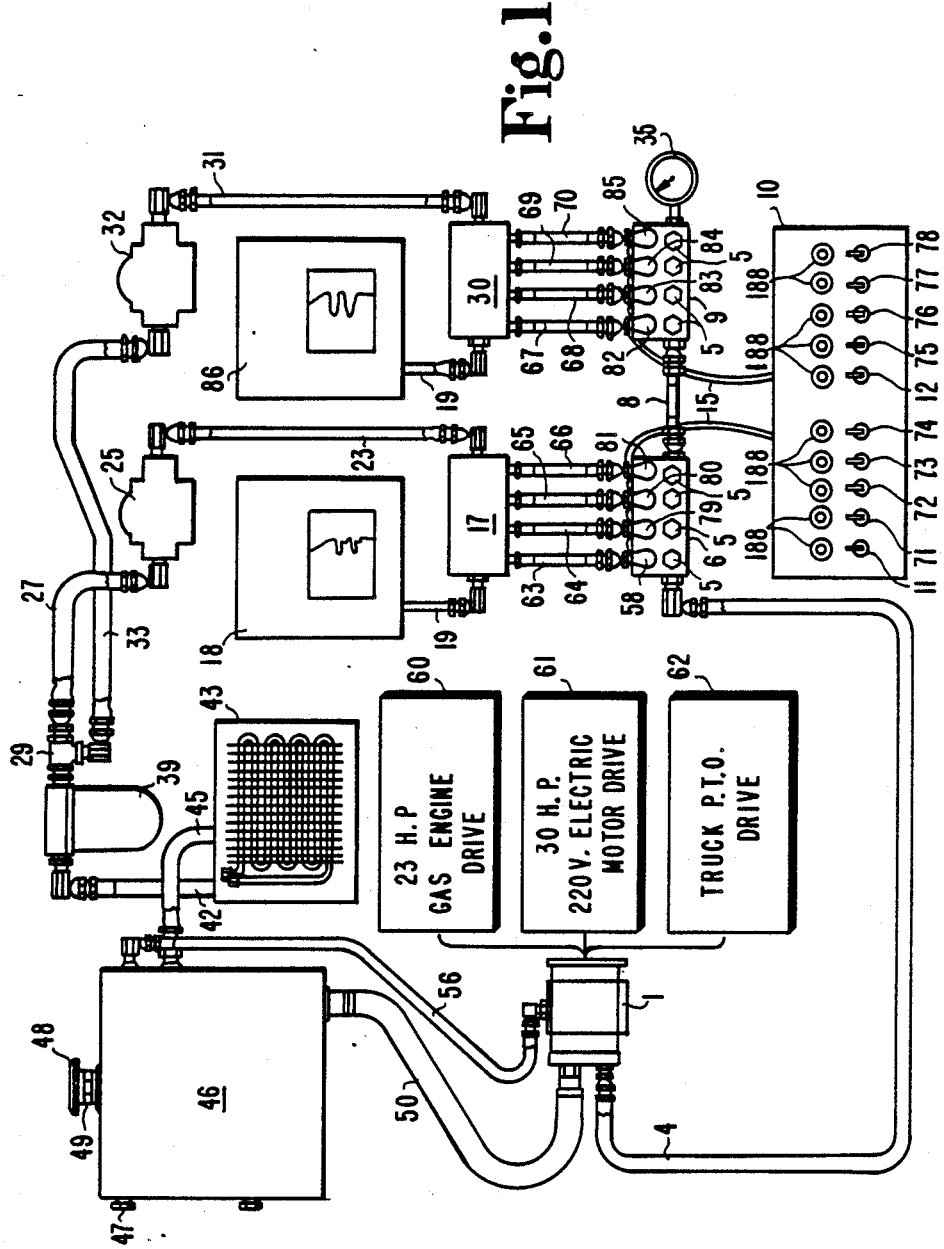
FIG. 1 is a schematic of an apparatus of the invention.

FIG. 1 is a schematic of an apparatus of the invention. Hydraulic pump 1 is a pressure-compensated piston pump (Rexroth Variable Displacement Axial Piston Pump Model Number AV1O-045-DFR/30RPKC-61-NOO-5067) which maintains a constant pressure of hydraulic fluid regardless of the flow of the fluid. Hydraulic pump 1 pumps hydraulic fluid into discharge hose assembly 4. The hydraulic fluid passes into first control valve block 6, through hydraulic connecting hose assembly 8 and into second control valve block 9. It should also be noted that the pressure in control valve blocks 6 and 9 is measured by pressure gauge 35 which is connected to second control valve block 9.

Electrical control panel 10 consists of master toggle switches 11 and 12 which activate the operation of control valve blocks 6 and 9, respectively. When master switches 11 and 12 are off, no hydraulic fluid may pass into any of the feeder hose assemblies 63-66 and 67-70. When master switches 11 or 12 are on, hydraulic fluid may pass into either feeder hose assemblies 63-66 or 67-70, respectively, depending on the position of solenoid control valve switches 71-74 and 75-78. Indicator lights 188 indicate the position of switches 11, 12, and 71-78.

Switches 11, 12, and 71-78 in electrical control panel 10 control the flow of hydraulic fluid to hydraulic motors 25 and 32 (Commercial Shearing Model Number M30A-894-BEAF-15-43). The greater the flow of hydraulic fluid to motors 25 and 32, the faster the motors will rotate, which causes the rollers to rotate faster as described below. In order to achieve a desired rotational speed, each solenoid control valve switch 71-78 is electrically connected to its respective hydraulic solenoid valve 58 and 79-85. Wiring looms 15 contain the electrical wires connecting the solenoid control valve switches 71-78 to hydraulic solenoid valves 58 and 79-85. Feeder hose assemblies 63-66 and 67-70 carry a split flow of hydraulic fluid into pressure blocks 17 and 30. The respective pressures in pressure blocks 17 and 30 are measured and recorded by means of strip chart plotters 18 and 86, which are connected to pressure blocks 17 and 30 by hydraulic pen graph hose assemblies 19. Strip chart plotters 18 and 86 are used to record the pressure of the hydraulic fluid in pressure blocks 17 and 30 as a function of time. A significant feature of the present invention is the measurement of power utilized by hydraulic drive motors 25 and 32 as evidenced by the varying pressures of the hydraulic fluid in pressure blocks 17 and 30. After entering pressure blocks 17 and 30, the hydraulic fluid passes into hydraulic oil pressure hose assemblies 23 and 31, and then into hydraulic drive motors 25 and 32. Hydraulic drive motors 25 and 32 rotate rollers on which the wheels of a vehicle are placed, as described further below.

After passing through hydraulic drive motors 25 and 32, the hydraulic fluid passes through return hose assemblies 27 and 33, is mixed in pipe tee 29, then passes into filter element 39 where any impurities are filtered from the fluid. The fluid then exits filter element 39 into return hose assembly 42 and heat exchanger 43, where the fluid is cooled. The hydraulic fluid next passes through hose assembly 45 into hydraulic reservoir assembly 46.

Sight glass 47 on hydraulic reservoir assembly 46 is used to monitor hydraulic fluid in the system. Small losses of hydraulic fluid are inevitable during operation. If more fluid is needed, fluid can be manually introduced into the system by removing fill cap 48 and manually adding fluid through cap base 49.

Hydraulic pump 1 withdraws fluid from the reservoir assembly 46 by means of suction hose 50, which is connected to reservoir assembly 46. The fluid has then completed the full circulatory cycle and is ready to be pumped by hydraulic pump 1 into discharge hose assembly 4 for another cycle.

Pump return hose assembly 56 drains the excess fluid from hydraulic pump 1 into the reservoir assembly 46.

Hydraulic pump 1 may be powered, for example, by gas or diesel engine 60, electric motor 61, or truck power take off 62.

Figure 2:
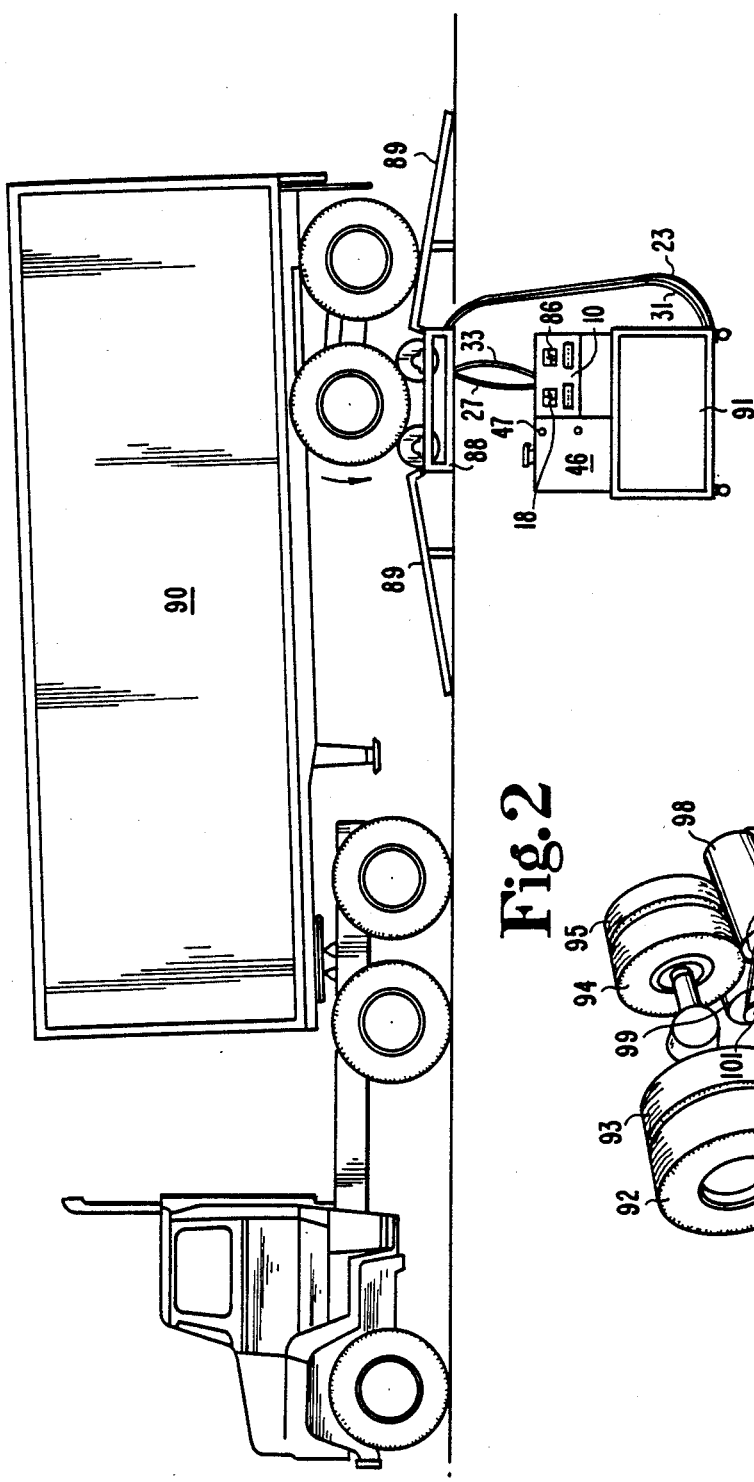
FIG. 2 is a view of a vehicle on an apparatus of the invention in a position for measuring the vehicle's brakes.

FIG. 2 is a view of a vehicle on an apparatus of the invention in a position for measuring the vehicle's brakes. Frame assembly 88 supports the weight of vehicle 90. Vehicle ramps 89 enable the vehicle to enter and exit the brake testing assembly. It should also be noted that the apparatus of the invention is portable so that the apparatus can be conveniently relocated to a different testing location. Power unit 91 provides hydraulic fluid to the brake testing assembly by means of hydraulic oil pressure hose assemblies 23 and 31. After entering hydraulic motors 25 and 32 (not shown in this figure), the fluid returns to power unit 91 by means of return hose assemblies 27 and 33. Also shown are hydraulic reservoir assembly 46, sight glass 47, strip chart plotters 1B and 86, and electrical control panel 10.

Figure 3:
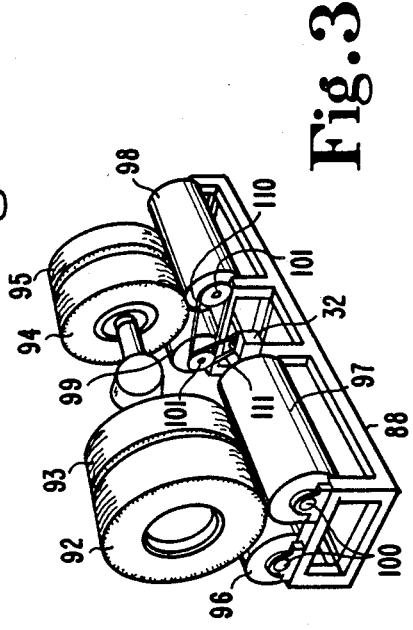
FIG. 3 is a perspective view of a vehicle wheel assembly in contact with two pairs of spaced rollers.

FIG. 3 is a perspective view of a vehicle wheel assembly in contact with two pairs of spaced rollers. Vehicle wheels 92-95 are in contact with rollers 96-99, and the axes of wheels 92-95 are generally parallel with the axes of the rollers 96-99. Rollers 96-99 are connected to frame assembly 88 by pillow block bearings 100. Hydraulic motor 32 provides power to rollers 98 and 99 by means of drum sprockets 101 and drive chains 110 and 111.

FIG. 4 is a side view of a vehicle wheel assembly in contact with the spaced rollers. Ramp support legs 102 provide support for vehicle ramps 89. Hold down bolts 103 are used to secure frame assembly 88 to the ground but may be easily removed for portability. Hinge assemblies 104 are used to connect vehicle ramps 89 to frame assembly 88. It should be noted that the apparatus of the invention allows the spaced rollers to be elevated above the ground.

FIG. 5 is a sectional view of a vehicle wheel assembly in contact with the spaced rollers. Hydraulic motor 32 causes motor sprocket 105 to rotate in a clockwise direction, thereby causing sprocket assembly 106 to rotate since sprocket assembly 106 is connected to motor sprocket 105 by means of drive chain 107. Sprocket assembly 106 is connected to roller 99 and thus, roller 99 rotates whenever sprocket assembly 106 rotates. Sprocket assembly 106 is also connected to sprocket assembly 108 by means of connecting chain 109. Thus, sprocket assembly 108 rotates whenever sprocket assembly 106 rotates. Since sprocket assembly 108 is connected to roller 98, roller 98 rotates whenever sprocket assembly 108 rotates.

FIG. 6 is a top view of the two pairs of spaced rollers and their respective drive systems. From this view, short roller shafts 110 and long roller shafts 111 can be easily seen.

FIG. 7 is a front view of a typical strip chart pen graph for a vehicle having bad brakes on the left wheel of the vehicle and good brakes on the right wheel of the vehicle. After the wheels of a vehicle are placed between the rollers as described above, the test process begins. Before the system is activated, there is no flow of hydraulic fluid to pressure blocks 17 or 30, so the strip charts indicate a pressure of zero. Activation of master switches 11 and 12 enable solenoid control valve switches 71-78. First speed switches 71 and 75 are activated, allowing a flow of hydraulic fluid through feeder lines 63 and 67, and causing the rollers to rotate at a predetermined speed. The predetermined speeds may be varied by varying the number of switches 71-78 turned on which energize solenoid valves 58 and 79-85, and by adjusting pressure compensated flow valves 5. The particular predetermined speed chosen for a particular application will vary according to the type of vehicle to be tested. The flow through feeder lines 63 and 67 causes the pressure in pressure blocks 17 and 30 to increase and then level off, as indicated by time period 120. The brakes of the vehicle are then applied during time period 121. As additional energy is required to maintain the speed of the rollers (pressure-compensated piston pump 1 maintains a constant pressure regardless of flow), the pressure in pressure blocks 17 and 30 increases. The amount of pressure increase indicates the condition of the brakes at the predetermined speed. The amount of absolute pressure increase necessary to conclude whether a particular braking system is bad will vary depending on the specifications of the particular vehicle, but a pressure increase of up to 2,500 p.s.i. has been found to indicate that the brakes of a semi-trailer are in good condition.

In FIG. 7, the pressure increase 140 of the left wheel is not as great as the pressure increase 141 of the right wheel, indicating that the braking system of the vehicle is not balanced. In addition, the low pressure increase 140 of the left brake indicates that it may be bad. At time period 122, the brakes are released and the pressure drops to its previous level.

Second speed switches 72 and 76 are then activated, allowing an additional flow of hydraulic fluid through feeder lines 64 and 68, and causing the rollers to rotate at a second higher, predetermined speed. Again, this causes the pressure in pressure blocks 17 and 30 to increase and then level off, as indicated by time period 123. The brakes are again applied during time period 124, causing an increase in pressure. As before, the magnitude of the increase, and the difference in increase between the left and right brakes, provide an indication of the condition of the braking system. It should also be noted that time period 124 is longer than time period 121 because it takes more time for the system to reach the maximum pressure increase at the second predetermined speed than the first. This effect is similar to the increased braking time needed to stop a vehicle which is travelling at a high speed as opposed to a slower speed.

The process is repeated at two increased, predetermined speeds as indicated by time periods 125 and 126. Again, it should be noted that time periods 133 and 134 are increasingly longer than time periods 121 and 124 because of the increased, predetermined speeds. It may be appreciated that different simulated road speeds are used to test a braking system because bad brakes may be detectable at one road speed but not another. The graphical output from the application of a vehicle's spring brakes is identical to the output for a test of regular brakes.

The present system also allows anti-skid braking systems to be tested. Anti-skid brakes automatically apply braking pressure at very rapid intervals. Thus when the anti-skid brakes are applied as shown for the right wheel in FIG. 7 at time 127, a good anti-skid brake produces a rapid series of slight increases and decreases in pressure as shown at time interval 128.

FIG. 8 is a front view of a typical strip chart pen graph for one wheel of a vehicle having bad anti-skid brakes. Switches 75-78 are activated, allowing flow of hydraulic fluid through feeder lines 67-70, and causing the rollers to rotate at the fourth (highest) predetermined speed. This causes the pressure in pressure blocks 17 and 30 to increase and then level off, as indicated by time period 129. The brakes are applied during time period 130, causing an increase in pressure. Once again, the magnitude of the increase provides an indication of the condition of the braking system. However, since the graph does not show a rapid series of slight increases and decreases in pressure during time period 131, this indicates that the brakes are not exhibiting anti-skid braking characteristics. During time period 132, the brakes are released and the pressure drops to its previous level. It may be noted that this type of braking pressure curve is similar to that of a regular vehicle brake exhibiting good braking capability (see lower graph of FIG. 7 during time period 126).

The present invention also contemplates a number of variations of the apparatus disclosed above that would not depart from the scope of the invention. For example, strip chart plotters 18 and 86 could be replaced by any other measuring device, including a digital device. Alternatively, a circular graph plotter could be used instead of a strip chart plotter. Also, an apparatus of the invention can be used to test one vehicle wheel at a time by activating only one hydraulic motor, motor 25 or 32.

Many changes could be made in the above construction and many apparently widely different embodiments of this invention could be made without departing from the scope thereof, and it is intended that all matter contained in the above description or shown in the accompanying drawings shall be interpreted as illustrative and not in a limiting sense.

I claim:

1. A braking force measuring system comprising:
   a pair of spaced rollers capable of supporting a wheel with the axis of the wheel generally parallel with the axes of the rollers,
   means for driving at least one of said rollers at a constant speed,
   means for measuring the energy required to rotate said driven roller(s), in which said driving means comprises at least one hydraulic motor operatively associated with said measuring means; and said measuring means comprises hydraulic fluid pressure measuring means.

2. The system of claim 1, further comprising means for recording the pressure of the hydraulic fluid provided to said hydraulic motor.

3. The system of claim 2 wherein said recording means comprises graphing means.

4. The system of claim 1, wherein said driving means further comprises a hydraulic pump capable of maintaining a constant pressure of hydraulic fluid to said hydraulic motor regardless of the flow of said fluid.

5. The system of claim 4 wherein said hydraulic pump comprises a pressure-compensated piston pump.

6. The system of claim 4 further comprising means for driving said hydraulic pump by a power take off of a vehicle.

7. The system of claim 1, further comprising means for driving said roller(s) at a plurality of predetermined speeds.

8. The system of claim 7, wherein the means for driving at a plurality of predetermined speeds comprises hydraulic fluid split flow means.

9. A braking force measuring system, comprising:
   a pair of spaced rollers capable of supporting a wheel with the axis of the wheel generally parallel with the axes of the rollers,
   means for driving at least one of said rollers at a constant speed,
   means for measuring the energy required to rotate said driven roller(s),
   means for recording the energy required to drive the driven roller(s), wherein:
   said driving means comprises a hydraulic motor, and said measuring means comprises hydraulic fluid pressure measuring means.

10. The system of claim 9 wherein said recording means comprises graphing means.

11. The system of claim 10 wherein said recording means comprises a pen graph recorder.

12. The system of claim 9, wherein said driving means further comprises a hydraulic pump capable of maintaining a constant pressure of hydraulic fluid to said hydraulic motor, regardless of the flow of said fluid.

13. The system of claim 9, further comprising means for driving said roller(s) at a plurality of predetermined speeds.

14. A method of measuring the braking force of a vehicle wheel braking system comprising:
positioning the wheel on a pair of spaced rollers with the axis of the wheel generally parallel with the axes of the rollers,
hydraulically driving at least one of said rollers at a constant speed,
hydraulically measuring the energy required to rotate said roller(s), both before and after the application of the vehicle braking system to said wheel.

15. The method of claim 14, further comprising the step of recording said measurements.

16. The method of claim 15 wherein said recording is graphical.

17. The method of claim 14, wherein said driving is performed by a system including a hydraulic pump and a hydraulic motor, said hydraulic pump being capable of maintaining a constant pressure of hydraulic fluid to said hydraulic motor regardless of the flow of said fluid.

18. The method of claim 14 wherein said measurements are taken at a plurality of predetermined speeds of said rollers.

19. A braking force measuring system, comprising
a pair of spaced rollers capable of supporting a wheel with the axis of the wheel generally parallel with the axes of the rollers,
a circulatory hydraulic system comprising
a hydraulic motor capable of driving at least one of said rollers at a constant speed,
means for pumping hydraulic fluid to said motor,
means for measuring the pressure of the hydraulic fluid pumped to said hydraulic motor.

20. The system of claim 19, further comprising:
means for recording the pressure of the hydraulic fluid provided to said hydraulic motor.

21. The system of claim 20 wherein said recording means comprises graphing means.

22. The system of claim 21 wherein said recording means comprises a pen graph recorder.

23. The system of claim 19, wherein said pumping means further comprises a hydraulic pump capable of maintaining a constant pressure of hydraulic fluid to said hydraulic motor regardless of the flow of said fluid.

24. The system of claim 23 wherein said hydraulic pump comprises a pressure-compensated piston pump.

25. The system of claim 23 further comprising means for driving said hydraulic pump by a power take off of a vehicle.

26. The system of claim 19, further comprising means for driving said roller(s) at a plurality of predetermined speeds.

27. The system of claim 26, wherein the means for driving at a plurality of predetermined speeds comprises means for splitting the flow of hydraulic fluid to the hydraulic motor.

28. A braking force measuring system, comprising
two pairs of spaced rollers, each pair being capable of supporting a wheel with the axis of the wheel generally parallel with the axes of the rollers,
a circulatory hydraulic system comprising
for each pair of spaced rollers, a hydraulic motor capable of driving at least one of said rollers at a constant speed,
means for pumping hydraulic fluid to said motors;
means for independently controlling the flow of hydraulic fluid pumped to each of said hydraulic motors,
means for independently measuring the pressure of the hydraulic fluid pumped to each of said hydraulic motors,
means for independently recording the pressure of the hydraulic fluid provided to said hydraulic motors.

29. The system of claim 28 wherein said recording means comprises graphing means.

30. The system of claim 29 wherein said recording means comprises a pen graph recorder.

31. The system of claim 28, wherein said pump means is capable of maintaining a constant pressure of hydraulic fluid regardless of the flow of said fluid.

32. The system of claim 28, further comprising means for independently driving said roller(s) at a plurality of predetermined speeds.

33. The system of claim 28, further comprising:
means for elevating said rollers,
ramp means for allowing a vehicle to be driven onto said pairs of spaced rollers.

34. The system of claim 33 wherein said ramp means are hinged from said elevating means.

35. The system of claim 28 wherein said system is portable.

* * * * *